(12) United States Patent
Girard et al.

(10) Patent No.: US 7,764,387 B2
(45) Date of Patent: Jul. 27, 2010

(54) APPARATUS AND METHOD FOR MEASURING SUSPENSION AND HEAD ASSEMBLIES IN A STACK

(75) Inventors: Mark T. Girard, Hutchinson, MN (US); Joseph P. Tracy, Hutchinson, MN (US); Ryan A. Jurgenson, Hutchinson, MN (US); David R. Swift, Glencoe, MN (US)

(73) Assignee: Applied Kinetics, Inc., Hutchinson, MN (US)

( * ) Notice: Subject to any disclaimer, the term of this patent is extended or adjusted under 35 U.S.C. 154(b) by 370 days.

(21) Appl. No.: 11/713,550

(22) Filed: Mar. 2, 2007

(65) Prior Publication Data

US 2008/0212107 A1    Sep. 4, 2008

(51) Int. Cl.
 *G01B 11/14* (2006.01)
 *G01B 11/26* (2006.01)
 *G01C 1/00* (2006.01)
 *G01N 21/86* (2006.01)
 *G01V 8/00* (2006.01)

(52) U.S. Cl. ............... 356/614; 356/139.03; 356/139.1; 250/559.29; 250/559.37

(58) Field of Classification Search ............... None
See application file for complete search history.

(56) References Cited

U.S. PATENT DOCUMENTS

| | | | |
|---|---|---|---|
| 5,517,312 A * | 5/1996 | Finarov | 356/630 |
| 5,636,013 A | 6/1997 | Swift | |
| 7,006,235 B2 * | 2/2006 | Levy et al. | 356/600 |
| 7,027,141 B2 | 4/2006 | Girard | |
| 7,088,448 B1 * | 8/2006 | Hahn et al. | 356/369 |
| 7,242,477 B2 * | 7/2007 | Mieher et al. | 356/401 |
| 7,433,023 B2 * | 10/2008 | Swift et al. | 356/4.01 |
| 7,489,410 B2 * | 2/2009 | Nishio | 356/614 |
| 2002/0135926 A1 * | 9/2002 | Girard et al. | 360/75 |
| 2007/0024870 A1 * | 2/2007 | Girard et al. | 356/623 |
| 2007/0075061 A1 * | 4/2007 | Shindo et al. | 219/121.83 |
| 2008/0062411 A1 * | 3/2008 | Smith et al. | 356/138 |
| 2008/0137070 A1 * | 6/2008 | Girard | 356/73 |

OTHER PUBLICATIONS

Abstract and Drawing of RD 76044 A published Dec. 10, 2003.*
U.S. Appl. No. 10/940,160, filed Sep. 13, 2004, entitled "Apparatuses and Methods for Laser Processing of Head Suspension Components", in the name of Mark T. Girard.

* cited by examiner

*Primary Examiner*—Tarifur Chowdhury
*Assistant Examiner*—Gordon J Stock, Jr.
(74) *Attorney, Agent, or Firm*—Kagan Binder, PLLC

(57) ABSTRACT

An optical measurement device for determining at least two parameters of a measurement location of a surface of at least one workpiece positioned in a known coordinate system is described. The device comprises a first light source providing a first measurement beam. The first measurement beam is directed at a first surface of a workpiece. The device also comprises a second light source providing a second measurement beam. The second measurement beam is directed at a second surface of a workpiece facing opposite the first surface. Further, the device comprises a first system of receiving optics. The first system of receiving optics detects the incoming position of the first measurement beam. The first system of receiving optics is positioned on an opposite side of a workpiece from the first light source. Further still, the device comprises a second imaging system. The second system of receiving optics detects the incoming position of the second measurement beam. The second system of receiving optics is positioned on an opposite side of a workpiece from the second light source.

24 Claims, 8 Drawing Sheets

APPARATUS AND METHOD FOR MEASURING SUSPENSION AND HEAD ASSEMBLIES IN A STACK

BACKGROUND

The present invention relates to apparatuses and methods for determining spatial information of a workpiece surface positioned in a predetermined coordinate system. More particularly, the present invention relates to apparatuses and methods for determining spatial information of surfaces of head suspensions or head suspension assemblies in a stack such as those that are generally utilized in dynamic storage devices such as magnetic disk drives. The particular device disclosed has the capability of making measurements on both sides of a head assembly while the head assembly remains in position in the stack.

Components of many electronic, electro-mechanical, and optical devices and systems need to be assembled with precise alignment to assure optimal performance. In the case of certain magnetic recording disk drives, for example, a read/write head needs to be carefully positioned with respect to a surface of a disk during use to assure optimum performance and to avoid crashing the head into the disk and causing damage.

Magnetic disk drives that utilize a head assembly for reading and/or writing data on a rotatable magnetic disk are well known in the art. In such drives, the head assembly is typically attached to an actuator arm by a head suspension assembly. A head suspension assembly includes a head suspension and an aerodynamically designed slider onto which a read/write head is provided so that the head assembly can be positioned very close to the disk surface. Such a head position during usage, that is, where the head is positioned over a spinning disk, is defined by balancing a lift force caused by an air bearing that spins with the disk acting upon the aerodynamically designed slider and an opposite bias force of the head suspension. As such, the slider and head fly over the spinning disk at precisely determined heights.

Head suspensions generally include an elongated load beam with a gimbal flexure located at a distal end of the load beam and a base plate or other mounting means at a proximal end of the load beam. According to a typical head suspension construction, the gimbal flexure comprises a platform or tongue suspended by spring or gimbal arms. The slider is mounted to the tongue thereby forming a head suspension assembly. The slider includes a read/write magnetic transducer provided on the slider and the slider is aerodynamically shaped to use an air bearing generated by a spinning disk to produce a lift force. During operation of such a disk drive, the gimbal arms permit the slider to pitch and roll about a load dimple or load point of the load beam, thereby allowing the slider to follow the disk surface even as such may fluctuate.

The head slider is precisely mounted to the flexure or slider mounting tongue of a head suspension at a specific orientation so as to fly at a predetermined relationship to the plane of the disk surface. During manufacturing and assembling of the head suspension assembly, any lack of precision in forming or assembling the individual components can contribute to a deviation in the desired relationship of the surfaces of these components. A buildup of such deviations from tolerance limits and other parameters in the individual components can cause a buildup of deviation from the desired relationship of the head slider to the associated disk surface in the complete head suspension assembly. The parameters of static roll attitude and static pitch attitude in the head suspension assembly generally result from these inherent manufacturing and assembly tolerance buildups.

Ideally, for optimum operation of a disk drive as a whole, during assembly of a head slider to a slider mounting tongue, the plane of a load beam mounting surface datum and the plane of a head slider surface datum should be in a predetermined relationship to each other. The load beam mounting surface datum and the slider surface datum are usually planar surfaces that are used as reference points or surfaces in establishing the relationship of the plane of an actuator mounting surface and the plane of the surface of the head slider surface relative to each other. The upper and lower planar surfaces of the head slider are also manufactured according to specifications usually requiring them to be essentially or nominally parallel to each other.

In practice, several optical methods can be used to measure the angle of component surfaces, such as laser triangulation or interferometry. Another optical method that can be used is known as autocollimation. An autocollimator is able to measure small surface angles with very high sensitivity. Light is passed through a lens where it is collimated prior to exiting the instrument. The collimated light is then directed toward a surface, the angle of which is to be determined. After being reflected by the surface to be measured, light enters the autocollimator and is focused by the lens. Angular deviation of the surface from normal to the collimated light will cause the returned light to be laterally displaced with respect to a measurement device such as a position sensing device. This lateral displacement is generally proportional to the angle of the surface and the focal length of the lens. An advantage of such a device is that the angle measurement is independent of the working distance of the lens or the distance between the instrument and the component being measured. However, one limitation of this type of device is that it is difficult to use and to measure poorly reflective or non-reflective surfaces.

In the case of measuring the angle of a surface for receiving a slider, accurate information for the mounting or attachment area of the surface is desired. In typical autocollimator based static attitude measurement, the angular information for the mounting area is provided as an average angle for the mounting area. In certain cases, however, it may be desirable to measure the angle of more specific or distinct location of the mounting area such as if the mounting area has small or localized high points on the surface. Such localized high points could affect the angle of a slider mounted to the surface.

SUMMARY

The present invention provides apparatuses and methods for determining spatial information of a workpiece surface positioned in a predetermined coordinate system. For example, apparatuses and methods of the present invention can be used to determine one or more coordinates of one or more measurement locations of a workpiece within a predetermined coordinate system. Such coordinates can be used to define points, lines, and/or surfaces of the workpiece within the coordinate system. In one exemplary application, apparatuses and methods of the present invention can be used to determine spatial information of surfaces of head suspensions or head suspension assemblies such as those that are generally utilized in dynamic storage devices such as magnetic disk drives. Such spatial information can be used to determine z-height and/or static attitude, for example. Further, in an exemplary embodiment, the optical measurement device may be used to provide measurements of head assemblies already manufactured into a stack.

In accordance with one exemplary embodiment, an optical measurement device for determining at least two parameters of a measurement location of a surface of a first workpiece positioned in a known coordinate system is described. The device comprises a first light source providing a first measurement beam. The first measurement beam is directed at a first surface of a first workpiece. The device also comprises a second light source providing a second measurement beam. The second measurement beam is directed at a second surface of a second workpiece opposite the first side. Further, the device comprises a first system of receiving optics. The first system of receiving optics detects the incoming position of the first measurement beam. The first system of receiving optics is positioned on an opposite side of the first workpiece from the first light source. Further still, the device comprises a second system of receiving optics. The second system of receiving optics detects the incoming position of the second measurement beam. The second system of receiving optics is positioned on an opposite side of the second workpiece from the second light source.

In accordance with another exemplary embodiment, a method of determining at least two parameters of a measurement location of a first surface of a first workpiece positioned in a known coordinate system and determining at least two coordinates of a measurement location of a second surface of a second workpiece positioned in a known coordinate system, where the first surface is opposite the second surface, is described. The method comprises providing a first measurement beam from a first light source. The first measurement beam is directed at the first surface of the first workpiece. The method also comprises providing a second measurement beam from a second light source. The second measurement beam is directed at the second surface of the second workpiece opposite the first surface. Further, the method comprises detecting the incoming position of the first measurement beam by a first system of receiving optics. The first system of receiving optics is positioned on an opposite side of the first workpiece from the first light source. Further still, the method comprises detecting the incoming position of the second measurement beam by a second system of receiving optics. The second system of receiving optics is positioned on an opposite side of the second workpiece from the second light source.

In accordance with yet another exemplary embodiment, an optical measurement device for determining at least two parameters of a measurement location of a first surface of a first workpiece positioned in a known coordinate system and determining at least two coordinates of a measurement location of a second surface of a second workpiece positioned in a known coordinate system, where the first surface is facing opposite the second surface, is described. The device comprises a means for providing a first measurement beam from a first light source. The first measurement beam is directed at the first surface of the first workpiece. The device also comprises a means for providing a second measurement beam from a second light source. The second measurement beam is directed at the second surface of the second workpiece opposite the first surface. Further, the device comprises a means for detecting the incoming position of the first measurement beam by a first imaging system. The first system of receiving optics is positioned on an opposite side of the workpiece from the first light source. Further, the device comprises a means for detecting the incoming position of the second measurement beam by a second system of receiving optics. The second imaging system is positioned on an opposite side of the second workpiece from the second light source.

Alternative exemplary embodiments relate to other features and combinations of features as may be generally recited in the claims.

BRIEF DESCRIPTION OF THE DRAWINGS

A better understanding of the features and advantages of the present invention will be obtained by reference to the following detailed description that sets forth illustrative embodiments by way of example only, in which the principles of the invention are utilized, and the accompanying drawings, of which.

DETAILED DESCRIPTION

Figure 1:
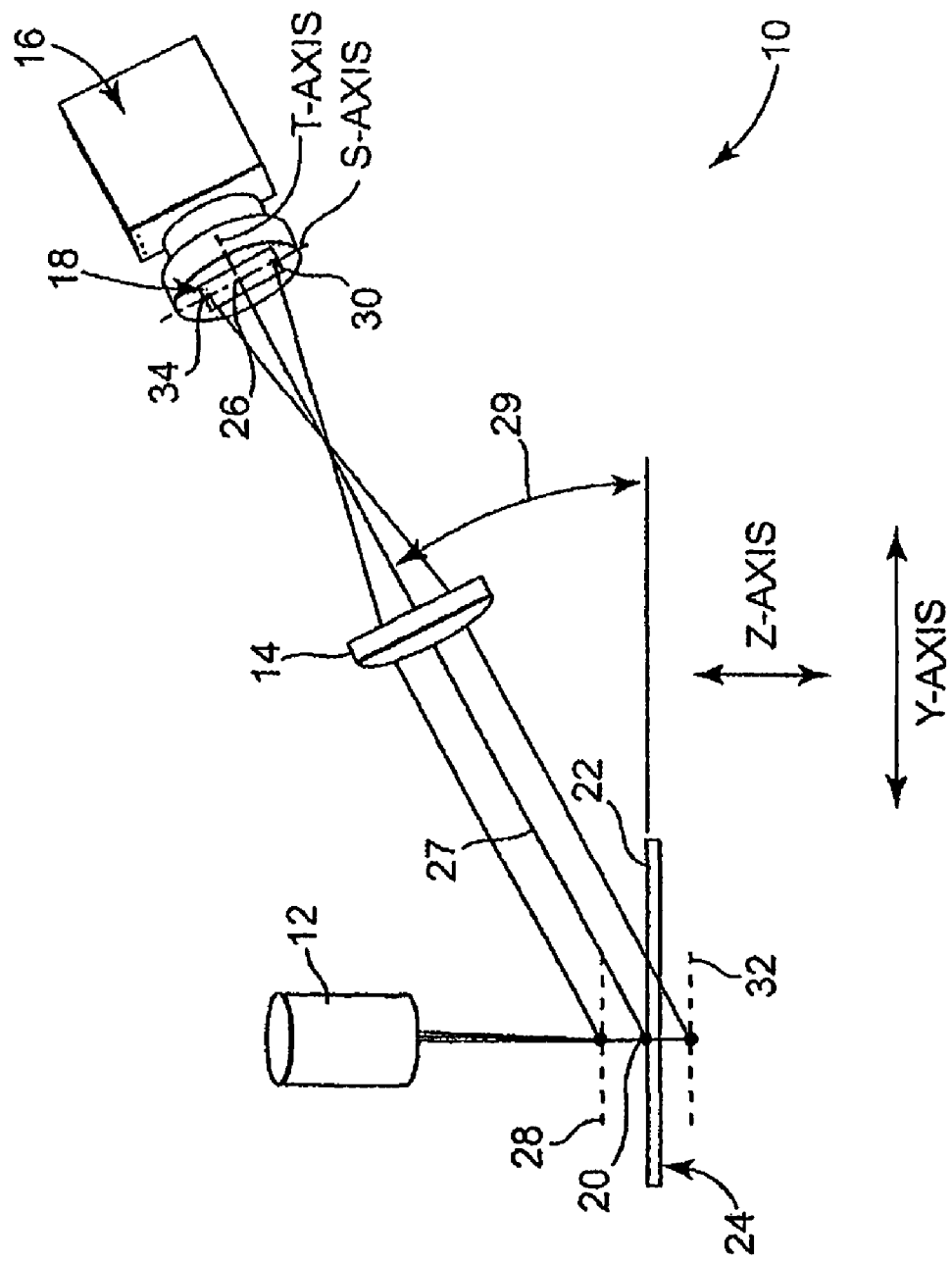
FIG. 1 is a schematic view of an optical triangulation system positioned relative to an x-y-z coordinate system and having a light source, image lens, and a camera and showing in particular how the optical triangulation system can be setup to provide a z-coordinate of an illuminated measurement location on a workpiece surface.

Before describing in detail the particular improved system and method, it should be observed that the invention includes, but is not limited to a novel structural combination of conventional data/signal processing components and communications circuits, and not in the particular detailed configurations thereof. Accordingly, the structure, methods, functions, control and arrangement of conventional components and circuits have, for the most part, been illustrated in the drawings by readily understandable block representations and schematic diagrams, in order not to obscure the disclosure with structural details which will be readily apparent to those skilled in the art, having the benefit of the description herein. Further, the invention is not limited to the particular embodiments depicted in the exemplary diagrams, but should be construed in accordance with the language in the claims.

Triangulation techniques can be used to establish the distance between two points or the relative position of two or more points. Triangulation relies on geometry and the knowledge of certain distances and/or angles to determine the position of a point, such as the position of the point in a predetermined coordinate system. Optical systems that use triangulation are known. One type of optical system that uses triangulation is known as a point range sensor and is used to determine the distance between the sensor and a target object.

Other optical systems that use triangulation are known. However, one limitation of these systems is that only two coordinates of a point located in a three coordinate system can be resolved as described in greater detail below.

An optical triangulation system 10 is schematically shown in FIG. 1. The triangulation system 10 includes a light source 12, an imaging lens 14, and a camera 16 having a position sensing detector 18. The position sensing detector 18 is an important component of the triangulation system 10 and can sense light that is impinging on the detector 18. The detector 18 can also provide positional information related to where the light is impinging on the detector 18. For example, one type of device that can be used as the position sensing detector 18 is a charge coupled device or CCD. These devices are conventionally known and a typical CCD includes a semiconductor device that has an array of light sensitive elements. The individual light sensitive elements of the array of light sensitive elements are provided in a known geometric arrangement relative to each other. This type of device can be setup to relate the position of light impinging on the array of light sensitive elements with the position of the source of light on a reference surface. Generally, such setup relies on knowledge of the geometry of the system in which the CCD is used, such as the relative positions of the array of light sensitive elements and the reference surface, for example.

In order to setup the triangulation system 10, the light source 12, which is typically a laser, illuminates a focused spot 20 on a surface 22 of a workpiece 24. The surface 22 is positioned relative to an x-y-z coordinate system. For example, the surface 22 is preferably coplanar with an x-y plane of the x-y-z coordinate system. As shown, the light source 12 is normally incident to the surface 22. Alternatively, the light source 12 can be projected onto the surface 22 at an angle, however, at an angle other than 90 degrees the spot 20 may translate across the surface 22 as the surface 22 moves in the z-direction (during setup, for example). This generally, makes it more difficult to perform the calculations required to setup the system as it adds an additional factor that needs to be accounted for. Further, another physical limitation of the device depicted in FIG. 1, is that a normally incident light source is needed for desirable performance. Due to certain constraints however, a normally incident light source may not be desirable and/or possible.

An image 26 of the illuminated spot 20 is thus seen by the detector 18 as viewed along a viewing direction 27 that makes an angle 29 with the surface 22. As the surface 22 is moved in the z-direction, the spot 20 also moves in the z-direction and, as a result, the image 26 is seen to move along the s-axis of the detector 18 in a manner proportional to the movement of the spot 20 in the z-direction. For example, if the surface 22 is moved by a known distance from a known position, as shown, to the location of the broken line indicated by reference numeral 28, image 26 will move along the s-axis of the detector 18 by distance that is proportional to the distance that the surface 22 is moved. As such, the detector 18 will see the image identified by reference numeral 30. Because the detector 18 can sense the position of light impinging on it, the distance (as defined by the array of light sensitive elements of the detector 18, for example) between the image 26 and the image 30 can be used to define a correlation between the distance that the surface 22 has been moved from its initial position and the distance between the image 26 and the image 30 on the detector 18. Likewise, if the surface 22 is moved by a known distance from a known position, as shown, (in an opposite direction) to the location of the broken line indicated by reference numeral 32, the image 26 will move along the s-axis of the detector 18 by a distance that is proportional to the distance that the surface 22 is moved. Here, the detector 18 will see the image identified by reference numeral 34 and a similar setup approach can be used. When the triangulation system 10 is setup in this manner, the z-coordinate of an illuminated spot on the surface 22 of the workpiece 24 can be determined in an x-y-z coordinate system.

Figure 2:
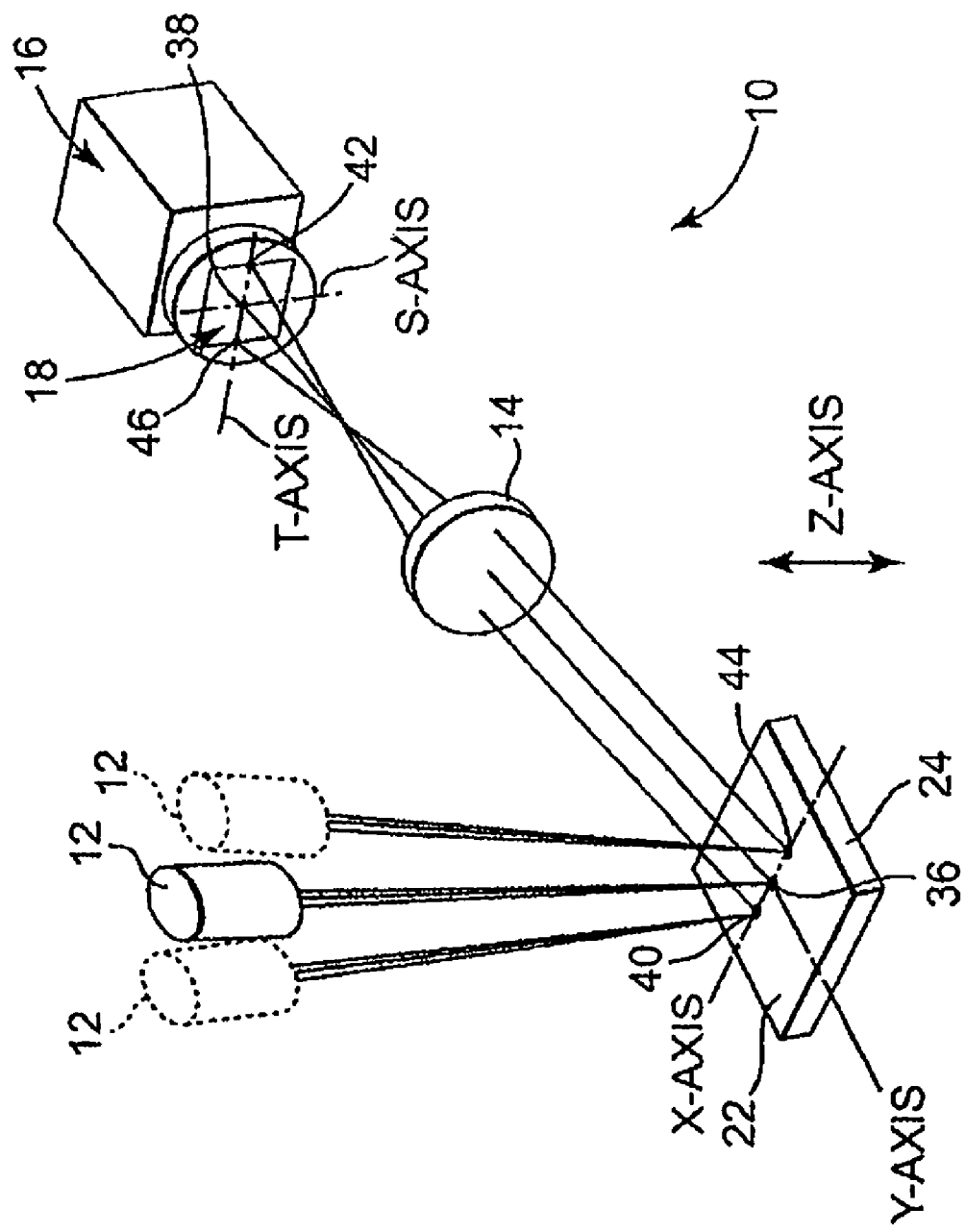
FIG. 2 is schematic view of the optical triangulation system of FIG. 1 showing in particular how the optical triangulation system can be setup to provide a x-coordinate of an illuminated measurement location on a workpiece surface.

The detector 18 also includes a t-axis that is perpendicular to the s-axis, as illustrated and positional information along the t-axis of the detector 18 can also be obtained for determining an x-coordinate of an illuminated spot on the surface 22 of the workpiece 24. In particular, the t-axis can be setup in a manner similar to that described above. Referring to FIG. 2, the triangulation system 10 is shown wherein the light source 12 illuminates a spot 36 on the surface 22. The detector 18 thus sees an image 38 of the spot 36. For setup purposes, an illuminated spot 40 can be provided on the surface 22. This can be done by moving the light source 12 along the x-axis as shown, providing one or more additional light sources, or by scanning or otherwise redirecting a beam from one or more light sources. As such, the detector 18 sees an image 42 of the spot 40. The light source 12 can also be moved in the opposite direction to provide an illuminated spot 44 on the surface 22, and the detector 18 thus sees an image 46 of the spot 40. The illuminated spot 40 and/or the illuminated spot 44 (or any additional illuminated spots) can be used to define a positional correlation between the x-axis of the coordinate system and the t-axis of the detector 18. As such, when properly setup, the x-coordinate of an illuminated spot on the surface 22 of the workpiece 24 can be determined.

When setup as above (with respect to FIGS. 1 and 2), the triangulation system 10 cannot definitively determine the y-coordinate of an illuminated spot on the surface 22 of the workpiece 24 unless other factors are eliminated or known such as by holding the surface 22 constant in the z-direction. This is because the detector 18 cannot distinguish between a change in the position of an illuminated spot along the z-axis from a change in the position of the illuminated spot along the y-axis. More specifically, a change in the position of an illuminated spot along the z-axis results in a corresponding movement of the image of the illuminated spot along the s-axis of the detector 18. A change in the position of the illuminated spot along the y-axis also results in a corresponding movement of the image of the illuminated spot along the s-axis of the detector 18. Because of this, the detector 18 cannot distinguish between such a change in position of an illuminated spot in the y-axis and the z-axis.

Figure 3:
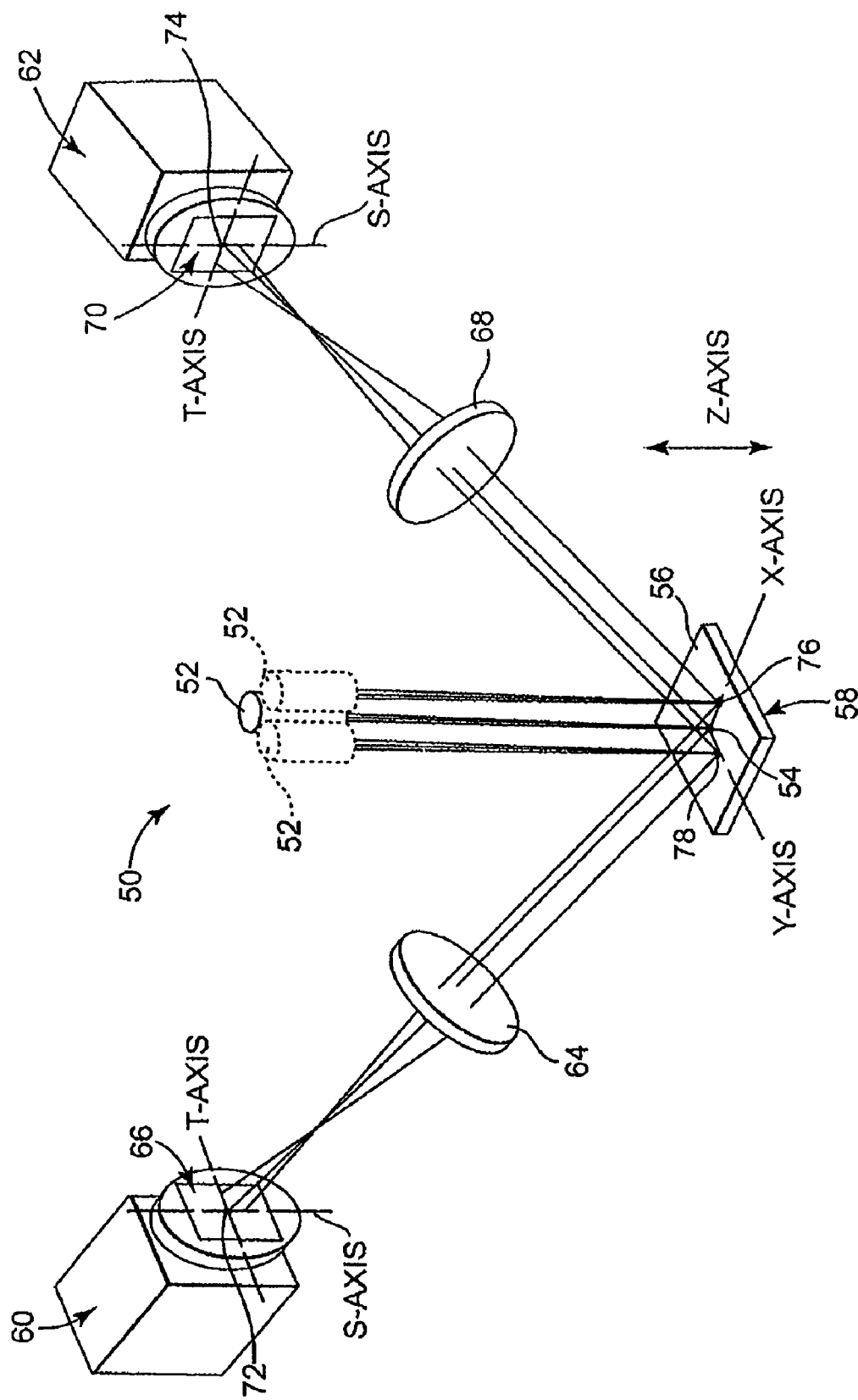
FIG. 3 is a schematic view of an optical measurement device positioned relative to an x-y-z coordinate system and having first and second cameras, first and second imaging lenses, respectively, and a light source that can provide at least one illuminated measurement location on a surface of a workpiece.

In accordance with other exemplary systems, the problem of being able to determine two dimensions by viewing an illuminated spot from different locations has been addressed. For example, an exemplary optical measurement system 50 is depicted schematically in FIG. 3. The measurement system 50, as shown, includes a light source 52, which preferably includes a laser that can illuminate a focused spot 54 on a surface 56 of a workpiece 58. Preferably, the illuminated spot 54 can be viewed from different locations (along different viewing paths, for example) by using first and second cameras 60 and 62, as shown. A single camera may be used that moves between different predetermined or known viewing positions. Moreover, a camera can be stationary while the optical path moves. The first camera 60 includes an imaging lens 64 that can provide an image 72 of the illuminated spot 54 on to a detector 66 of the first camera 60. Similarly, the second camera 62 includes an imaging lens 68 that can provide an image 74 of the illuminated spot 54 onto the detector 70 of the second camera 62.

In the system 50, the first camera 60 can be setup in the z-direction by moving the surface 56 of the workpiece 58 along the z-axis thereby moving an image of the spot 54 on the s-axis of the detector 66. The first camera 60 can also be setup in the y-direction by providing an illuminated spot 76 on the surface 56 that is spaced from the spot 54 at a known distance along the y-axis as illustrated (such as by moving the light source 52 as shown, for example). The y-direction setup can be made by correlating the distance between an image of the spot 54 on the detector 66 and an image of the spot 76 on the detector 66 to the distance between the spot 54 and 56. One problem with this setup, however, is that the first camera 60, by itself, cannot resolve the z and x axes as both appear as a movement in the s-axis of detector 66 during such a setup procedure. Moreover, when the second camera 62 is setup in the same way, the second camera 62, by itself, cannot resolve the z and y axes as both also appear as a movement in the s-axis of the detector 74 during setup. In any case, the first camera 60 can resolve y and the second camera 62 can resolve x.

However, by using information from the first and second cameras 60 and 62, and information including the geometry of the system 50, the x, y, and z axes can be resolved by using known triangulation and mathematical techniques. More specifically, the viewing directions of the first and second cameras 60 and 62 are each provided at a predetermined known angle to the surface 56 of the workpiece 58 (when used as a reference surface for setup purposes). In the device depicted in FIG. 3, the viewing directions are also preferably orthogonal to each other but may be provided at any desired angle (an angle of 90 degrees generally simplifies the mathematics required for resolving the x, y, and z axes). Also, distances between setup spots on the surface 56 and the detectors 66 and 74 can be measured and used to setup the system 50. By using this type of setup procedure, four known parameters about an illuminated spot on the surface 56 (information from the s and t axes from each of the cameras 60 and 62) along with the geometry of the system 50 can be used to resolve three unknown parameters (x, y, and z coordinates of the spot).

Accordingly, the measurement system 50 can provide the x, y, and z coordinates for one or more illuminated spots on a surface of a workpiece. This coordinate information can be used to determine points, lines, and planes related to a workpiece in a predetermined coordinate system.

Figure 4:
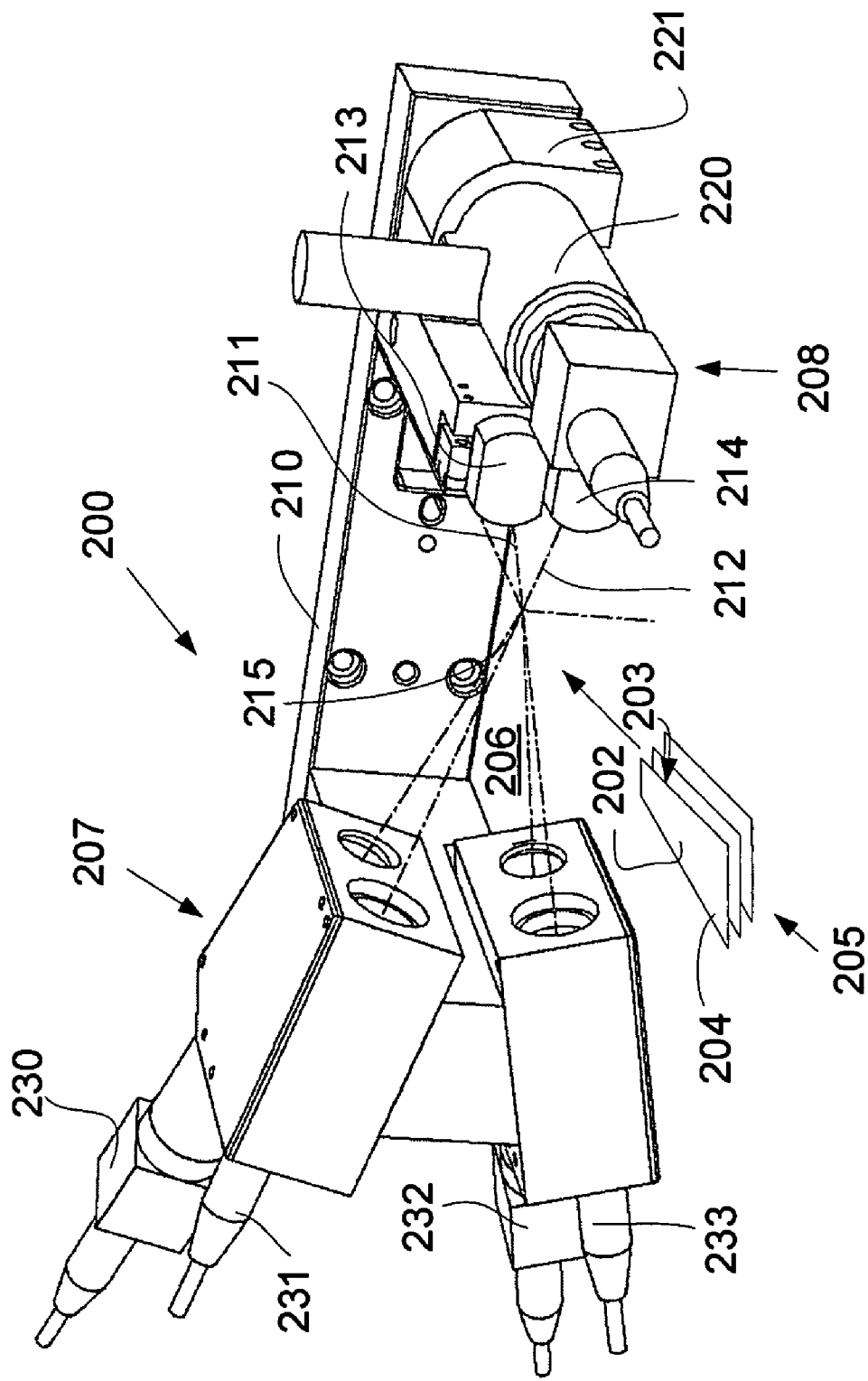
FIG. 4 is a perspective view of an exemplary embodiment of an optical measurement device.
Figure 5:
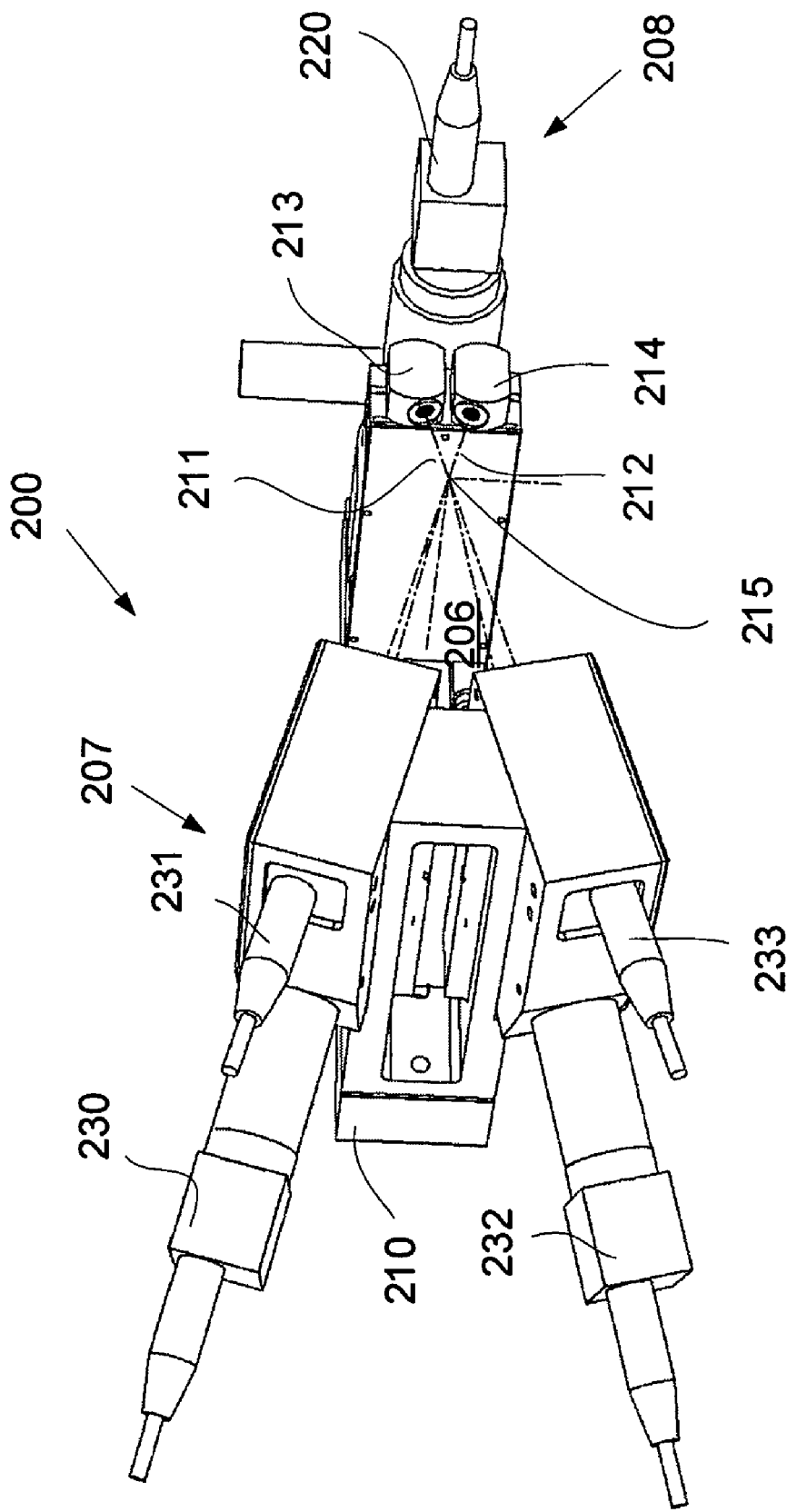
FIG. 5 is an alternative perspective view of the optical measurement device of FIG. 4.
Figure 6:
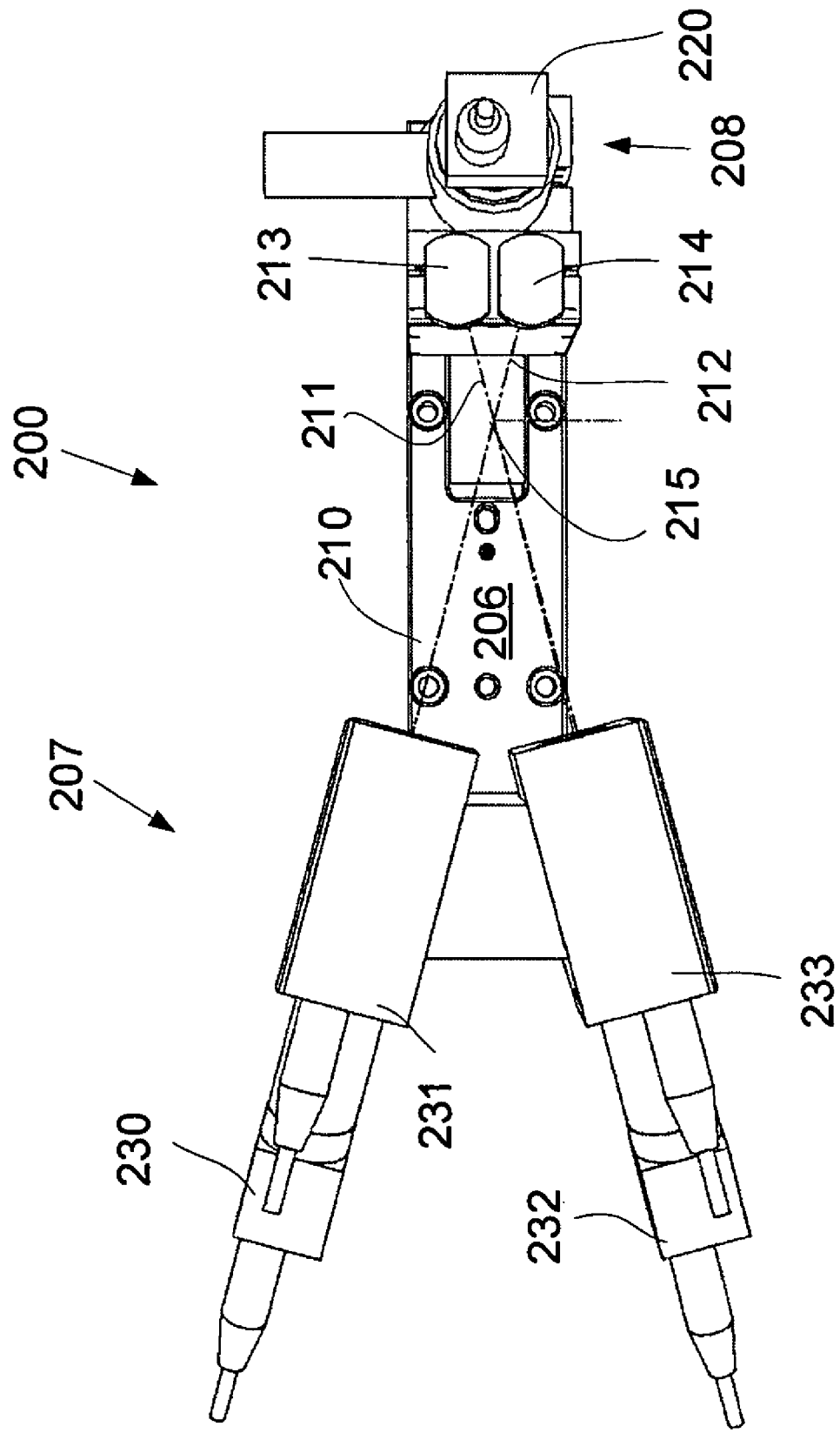
FIG. 6 is an side plan view of the optical measurement device of FIG. 4.

Referring to FIGS. 4 and 5, an exemplary embodiment of a measurement device 200, which overcomes some of the limitations of previous devices, in accordance with the invention, is illustrated. As described in more detail below, measurement device 200 may be used to measure the angular orientation as well as relative positional information of a top surface 202 and a bottom surface 203 of a component 204. Component 204 may be a suspension head assembly for a disk drive read/write head mounted in a stack 205 configuration. Alternatively, component 204 may be any of a variety of workpieces which require precision measurement of positional and orientational information. Device 200 is configured with a receiving region 206 in which the stack 205 may be positioned within a predetermined coordinate system. In accordance with an exemplary embodiment, receiving region 206 comprises an open area between an imaging system 207 and a measurement beam source 208. As schematically shown stack 204 may be moved into receiving region 206 and positioned for measurements.

In accordance with an exemplary embodiment, components 204 may comprise head suspensions and/or head suspension assemblies arranged in a stack configuration or alternatively individually, such as those used for dynamic storage devices and the like. Such head suspensions and head suspension assemblies are well-known and important functional parameters have been developed to ensure proper head position within dynamic storage devices. It may be desirable to measure the proper parameter, such as but not limited to head position and orientation in the stack configuration, such that those measurements are not appreciably changed when the stack assembly is placed into a storage system for operation thereof. For example, Applicant's copending non-provisional patent application, "Apparatuses and Methods for Laser Processing of Head Suspension Components," filed on Sep. 13, 2004 by Mark T. Girard and having application Ser. No. 10/940,160 describes such heads suspensions and head suspension assemblies and is incorporated by reference herein. As such, static attitude (both roll static attitude and pitch static attitude) as well as z-height of a head suspensions or head suspension assemblies arranged in a stack, alone, or in another configuration, can be measured in accordance with an exemplary embodiment. However, it is noted that any head suspension or head suspension assembly or similar component having one or more surfaces for which positional or angular information within a predetermined coordinate system is desired can be measured without departing from the scope of the invention as defined by the claims. Further, as will be further discussed, because of the angular orientation of the imaging systems and measurement beam sources, angular orientation and relative position of workpieces which may be in a configuration having relatively tight confines (i.e., it may be difficult to make a measurement because it may be difficult or impossible to get a device into the tight confines), can be measured using instrumentation in accordance with an exemplary embodiment. For example, a head suspension assembly stack may comprise multiple up-facing and downfacing heads one on top another with a very small space in between each up-facing and down-facing head (on the other order of 1 mm, e.g.). Because of such tight spaces, conventional instruments may not be able to make parameter measurements, with the head suspension assemblies in such an arrangement.

In an exemplary aspect device 200 may be integrated into a manufacturing line or system. For example device 200 may be used as a station of a head suspension stack manufacturing system or disk drive manufacturing system. In some of these systems, head suspensions are provided on a carrier strip and are moved from station to station by advancing the carrier strip in a processing direction. Device 200 can be integrated with such a system so that a head suspension or head suspension stack carried by in a manufacturing system can be positioned in the receiving region 206 of the device 200. Device 200 can be used to measure static attitude in accordance with the invention with the head suspension assembly being in the stack. A static attitude measurement can then be used to adjust static attitude, if desired. Also, head suspensions or head suspension assemblies can be provided to the receiving region 206 individually (not as part of a stack) by using a fixture, carrier, or tray that can be presented to the measurement position 206 such as by using an automated device or mechanism.

As depicted in FIGS. 4 and 5, device 200 generally includes a support 210 to which components of device 200 may be coupled. It is noted that device 200 preferably includes internal mounting structure for mounting and positioning such internal components of device 200 relative to each other in a functional manner in accordance with an exemplary embodiment. The mounting structures may come in any of a variety of configurations without departing from the scope of the claimed invention. Further, it should be appreciated that many other spatial configurations, combinations of components and mechanical configurations may be used without departing from the scope of the invention as defined by the claims. However, the FIGs. provide and illustrate a preferred spatial arrangement of the components of device 200. Also, exemplary device 200 is preferably designed to provide a compact, space-efficient device and the components of device 200 are depicted in an arrangement to provide such a compact and functional device. It is noted, however, that the components of device 200 can be spatially arranged in any functional manner in accordance with alternative exemplary embodiments. For example, the imaging system 207 and the measurement beam source 208 of device 200 do not need to be provided coupled to the same support 210 as depicted in FIGS. 4-7, but may be arranged supported separately.

Referring to FIGS. 4-7 generally, device 200 produces two laser beams 211 and 212 from an upper laser beam source 213 and a lower laser beam source 214, respectively. Laser beam 211 is configured to impinge on a first surface (which may be a surface of an up-facing head) of a suspension head 204 in receiving region 206, when stack 205 is positioned for measurement such that the point to be measured is positioned approximately at point 215. Similarly, laser beam 212 is configured to impinge on a second surface (which may be a surface of a down-facing head) of a suspension head 204 in receiving region 206, when stack 205 is positioned for measurement such that the point to be measured is positioned approximately at point 215. Suspension head 204 is representative of an up-facing head assembly while suspension head 203, although not directly seen below suspension head 204, is representative of a down-facing head. By having both laser beams impinging at relatively shallow angles on opposite facing heads, of the workpiece, measurements may be made simply of each of the up-facing and down-facing heads. In an exemplary embodiment, laser beam 211 and 212 may emanate from a single laser source in which the beam is split using an optical system or beams 211 and 212 may emanate from two separate lasers. In an exemplary embodiment, the laser beams are generated through use of a semiconductor laser. Many other and various configurations for the delivery of laser light may be derived without departing from the scope of the invention.

Referring again to FIGS. 4-7, device 200 may comprise an alignment system comprising an alignment camera 220 having a set of optics 221 which may be used to perform adjustments to laser beams 211 and 212. Camera 220 may allow an operator to make positional adjustments or alternatively may enable automated adjustments to be made through a computerized system. Camera 220 may be any of a variety of imaging devices including but not limited to charge coupled devices (CCDs) and complementary metal oxide semiconductor (CMOS) devices. Other refractive and/or reflective optics for camera 220 and optics 221 may be applied without departing from the scope of the claimed invention.

One particular exemplary advantage of the invention is because of the use of two laser beams impinging on the upper and lower surfaces of a workpiece, both upper and lower surface measurements may be made simply without need to flip either the measurement device or the stack. Further, in a particular exemplary embodiment it may be desirable to have only a single light source and a single set of receiving optics and flipping either the device or the stack in order to measure the opposing head assemblies. Further still, because of the low angle of incidence of laser beams 211 and 212 impinging on the workpiece, and consequently the low angle of reflection and having the receiving optics on an opposite side of the workpiece as the laser light source, measurements can be made to head suspension assemblies that are already assembled in a stack, or alternatively workpiece measurements can be made to other types of workpieces in relatively tight confines. According to embodiments of the present invention, a first light source, as the upper laser beam source 213, can impinge on the surface of the workpiece at an angle less than 90 degrees, less than 45 degrees, less than 20 degrees, or even less than 15 degrees, based upon the application. Likewise, a second light source, as the lower laser beam source 214, can impinge on the surface of the workpiece at an angle less than 90 degrees, less than 45 degrees, less than 20 degrees, or even less than 15 degrees, based upon the application.

Laser beams 211 and 212 may be used to illuminate a spot on a surface of up-facing and down-facing heads, respectively. Accordingly, measurements based on the reflection of laser light from the spot may be made by detection of the reflected light. In accordance with an exemplary embodiment, detection of the reflected light is carried out by imaging system 207 which comprises a first position camera 230, which may be used to provide z-height measurements of the top surface of the workpiece; a first autocollimator 231, which may be used to provide static attitude measurements of the top surface of the workpiece; a second position camera 232 which may be used to provide z-height measurements of the bottom surface of the workpiece, and a second autocollimator 233 which may be used to provide static attitude measurements of the bottom surface of the workpiece. Imaging cameras 230 and 232 comprise cameras which are capable of detecting the Z-height position of the workpiece. Autocollimators, are generally used to measure the relative planar orientation of the workpiece surface and have been described in U.S. Pat. No. 7,027,141, filed on May 3, 2002, issued on Apr. 11, 2006, to Mark Girard, and is herein incorporated by reference. Such cameras and autocollimators may be, but are not limited to including a charge coupled device (CCD), a complementary metal oxide semiconductor (CMOS) device, a position sensitive detector (PSD) or other detecting devices which are capable of sensing the position of an image formed on the device to function in a similar manner as described in relation to detectors 18, 66, and 70 in FIGS. 1 and 2. In a particular exemplary embodiment the imaging systems and autocollimators 230, 231, 232 and 233 may use ½-inch CCD arrays.

Figure 7:
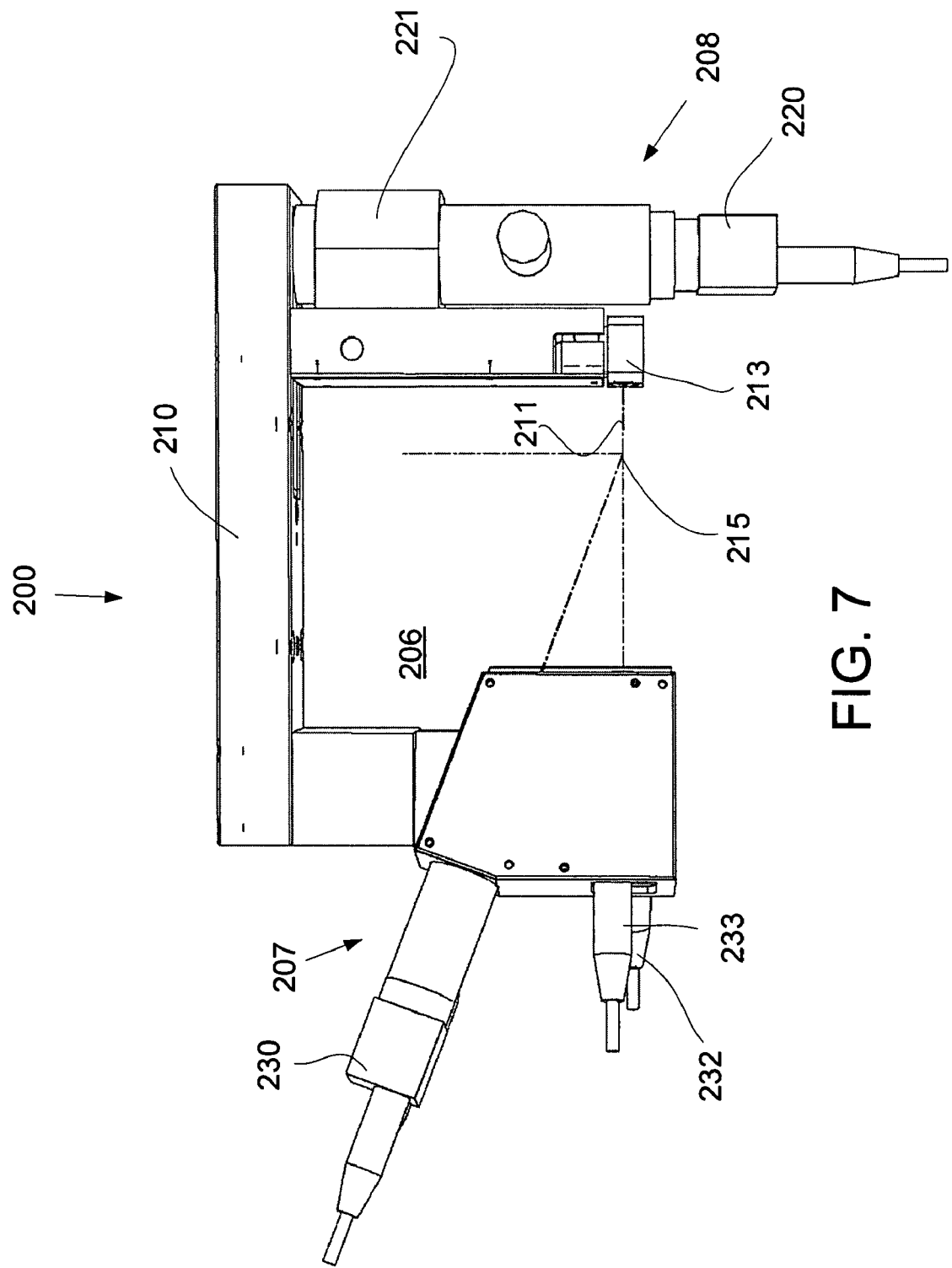
FIG. 7 is a top plan view of the optical measurement device of FIG. 4.

Referring now to FIG. 7, an exemplary embodiment of the top view of measurement device 200 is depicted. As shown, autocollimators 231 and 233, which are the orientation related devices, are generally aligned with the direction of laser beams 211 and 212, and consequently with the central axis of laser light sources 213 and 214. Cameras 230 and 232, which are the position deriving cameras are generally not aligned parallel to the laser beam path, but are aligned at an angle therewith. This off-axis alignment allows the detector and measurement algorithm to use more of the specular light, which reduces sensitivities related to the angle of the substrate relative to the impinging laser beam.

One exemplary application of device 200 is to be used to measure head alignment within the stack.

Another feature of an exemplary embodiment is that it is possible to perform all measurements substantially simultaneously. That is, the pitch static attitude (PSA), the roll static attitude (RSA) and the Z height measurements may all be carried out substantially simultaneously with a measurement speed of approximately 35 milliseconds (msec) for one of the top and the bottom surface before the stack is repositioned relative to the measurement device.

In accordance with an alternative embodiment, the design is not limited to the number of lasers depicted. It is possible to implement one to four lasers (and possibly more in certain applications). It may also be desirable to have one or more laser beams which contain multiple wavelengths and having corresponding receiving optics which may filter out one or more of the undesired wavelengths, depending on the job of the receiving optics. It may also be desirable in such situations to vary the intensity of the beams independently as well as configure the beam shape in a desired manner.

Figure 8:
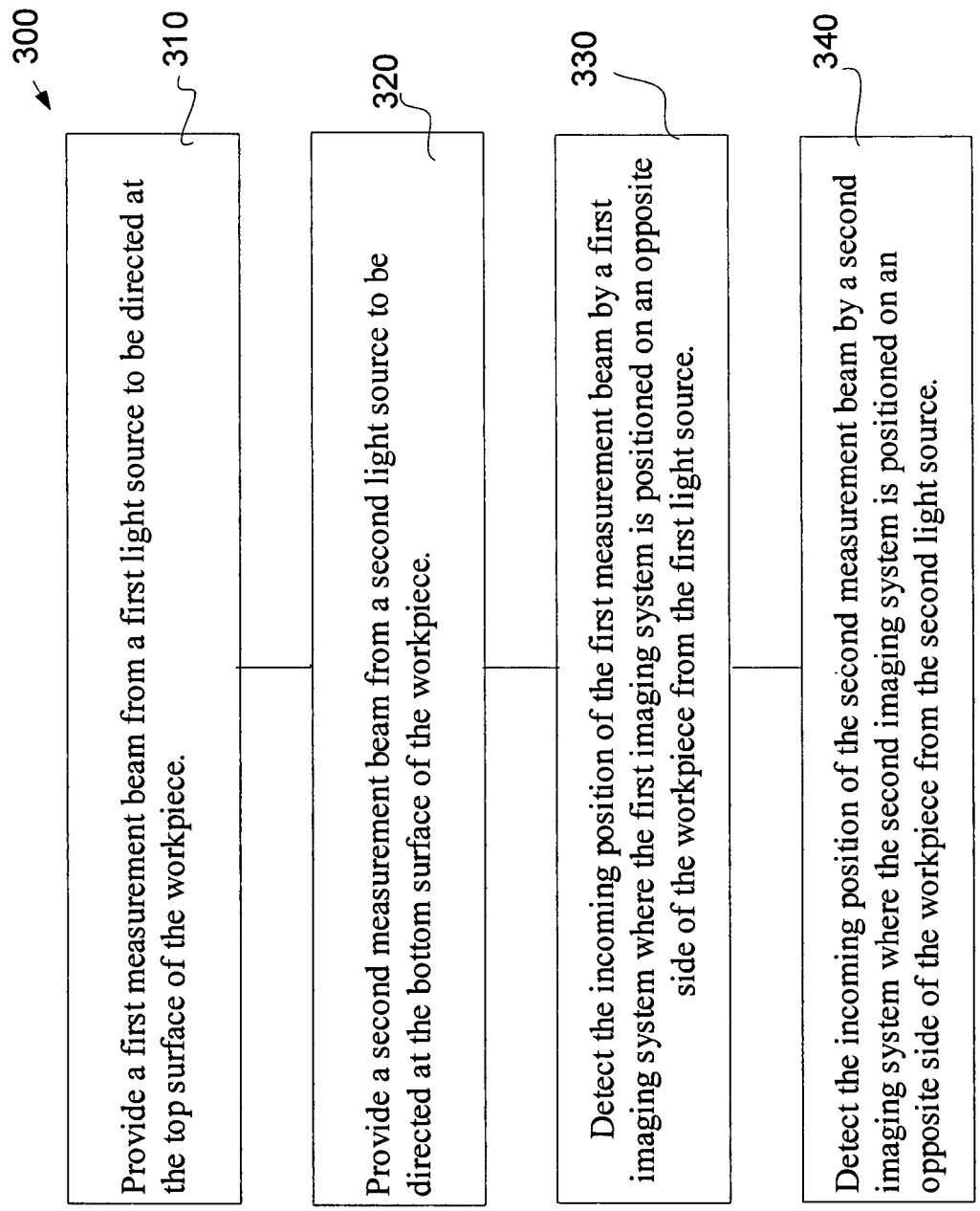
FIG. 8 is an exemplary block diagram of a process in accordance with at least one embodiment.

Referring now to FIG. 8, a method 300 of determining at least two parameters of a measurement location of a first surface of a workpiece positioned in a known coordinate system and determining at least two coordinates of a measurement location of a second surface of a workpiece positioned in a known coordinate system is depicted. Method 300 is an exemplary and generalized method in accordance with one embodiment of the invention. Method 300 comprises providing a first measurement beam from a first light source (process 310). The first measurement beam is directed at a surface of the first workpiece. Method 300 also comprises providing a second measurement beam from a second light source (process 320). The second measurement beam is directed at a surface of a second workpiece positioned opposite the first workpiece. Further, method 300 comprises detecting the incoming position of the first measurement beam by a first system of receiving optics (process 330). The first system of receiving optics is positioned on an opposite side of the workpiece from the first light source. Further still, method 300 comprises detecting the incoming position of the second measurement beam by a second system of receiving optics (process 340). The second system receiving optics is positioned on an opposite side of the workpiece from the second light source.

While the detailed drawings, specific examples, and particular formulations given described exemplary embodiments, they serve the purpose of illustration only. It should be understood that various alternatives to the embodiments of the invention described may be employed in practicing the invention. It is intended that the following claims define the scope of the invention and that structures within the scope of these claims and their equivalents be covered thereby. The hardware and software configurations shown and described may differ depending on the chosen performance characteristics and physical characteristics of the computing and analysis devices. For example, the type of computing device, communications bus, or processor used may differ. The systems shown and described are not limited to the precise details and conditions disclosed. Method steps provided may not be limited to the order in which they are listed but may be ordered any way as to carry out the inventive process without departing from the scope of the invention. Furthermore, other substitutions, modifications, changes and omissions may be made in the design, operating conditions and arrangements of the exemplary embodiments without departing from the scope of the invention as expressed in the appended claims.

What is claimed is:

1. An optical measurement device for determining at least two parameters of a measurement location of a first surface of a workpiece positioned in a known coordinate system wherein the first surface faces a first direction in the coordinate system, the optical measurement device comprising:
   a first light source providing a first measurement beam, the first measurement beam being directed at the first surface of the workpiece from a position at a first side of the workpiece;
   a first system of receiving optics, detecting an incoming position of the first measurement beam as reflected from the first surface of the workpiece, the first system of receiving optics positioned on an opposite side of the workpiece from the first light source, the first system of receiving optics including a position detector and an orientation detector;
   a second light source providing a second measurement beam, the second measurement beam being directed at a second surface, the second surface facing opposite the first surface; and
   a second system of receiving optics, detecting an incoming position of the second measurement beam, the second system of receiving optics positioned on an opposite side of the workpiece from the second light source.

2. The optical measurement device of claim 1, wherein the first light source impinges on the first surface of the workpiece at an angle less than 90 degrees.

3. The optical measurement device of claim 1, wherein the first light source impinges on the first surface of the workpiece at an angle less than 45 degrees.

4. The optical measurement device of claim 1, wherein the first light source impinges on the first surface of the workpiece at an angle less than 20 degrees.

5. The optical measurement device of claim 1, wherein the first light source impinges on the first surface of the workpiece at an angle less than 15 degrees.

6. The optical measurement device of claim 1, wherein the first system of receiving optics comprises at least one charge coupled device (CCD).

7. The optical measurement device of claim 1, wherein the first system of receiving optics comprises at least one complementary metal oxide semiconductor (CMOS) device.

8. The optical measurement device of claim 1, wherein the first system of receiving optics comprises at least one position sensitive detector (PSD).

9. The optical measurement device of claim 1, wherein the first system of receiving optics detects Z-height and static attitude.

10. The optical measurement device of claim 1, wherein the second system of receiving optics detects static attitude.

11. The optical measurement device of claim 1, wherein the first system of receiving optics and the second system of receiving optics both comprise position detectors, wherein each of the position detectors is not aligned with the first and second measurement beams in any of three orthogonal directions.

12. The optical measurement device of claim 1, wherein the first light source comprises more than one wavelength of light.

13. A method of determining at least two parameters of a measurement location of a first surface of a first workpiece positioned in a known coordinate system wherein the first surface faces a first direction and determining at least two parameters of a measurement location of a second surface of a second workpiece positioned in a known coordinate system wherein the second surface faces a second direction where the first surface is facing in an opposite direction than the second surface, the method comprising:
   providing a first measurement beam from a first light source, the first measurement beam being directed at the first surface of the first workpiece;
   providing a second measurement beam from a second light source, the second measurement beam being directed at the second surface of the second workpiece opposite the first surface;
   detecting an incoming position of the first measurement beam by a first system of receiving optics, the first system of receiving optics including a position detector and an orientation detector and positioned on an opposite side of the first workpiece from the first light source; and detecting an incoming position of the second measurement beam by a second system of receiving optics, the second system of receiving optics positioned on an opposite side of the second workpiece from the second light source.

14. The method of claim 13, wherein the second system of receiving optics comprises a position detector and an orientation detector.

15. The method of claim 13, wherein the first light source impinges on the first surface of the first workpiece at an angle less than 45 degrees.

16. The method of claim 13, wherein the first light source impinges on the first surface of the first workpiece at an angle less than 20 degrees.

17. The method of claim 13, wherein the second light source impinges on the second surface of the second workpiece at an angle less than 45 degrees.

18. The method of claim 13, wherein the second light source impinges on the second surface of the second workpiece at an angle less than 20 degrees.

19. The method of claim 13, wherein the first system of receiving optics comprises at least one charge coupled device (CCD).

20. The method of claim 13, wherein the first system of receiving optics comprises at least one complementary metal oxide semiconductor (CMOS) device.

21. The method of claim 13, wherein the first system of receiving optics detects Z-height and static attitude.

22. The method of claim 13, wherein the second system of receiving optics detects static attitude.

23. The method of claim 13, wherein the first system of receiving optics and the second system of receiving optics both comprise position detectors, wherein each of the position detectors is not aligned with the first and second measurement beams in any of three orthogonal directions.

24. An optical measurement device for determining at least two parameters of a measurement location of a first surface that faces a first direction of a first workpiece positioned in a known coordinate system and determining at least two parameters of a measurement location of a second surface that faces a second direction of a second workpiece positioned in a known coordinate system, where the first surface is facing in an opposite direction than the second surface, comprising:

a means for providing a first measurement beam from a first light source, the first measurement beam being directed at the first surface of the workpiece;

a means for providing a second measurement beam from a second light source, the second measurement beam being directed at the second surface of the workpiece opposite the first surface;

a means for detecting an incoming position of the first measurement beam by a first system of receiving optics, the first system of receiving optics including a position detector and an orientation detector and positioned on an opposite side of the first workpiece from the first light source; and a means for detecting an incoming position of the second measurement beam by a second system of receiving optics, the second system of receiving optics positioned on an opposite side of the second workpiece from the second light source.

* * * * *